US012645718B2

(12) United States Patent
Dilipkumar et al.

(10) Patent No.: US 12,645,718 B2
(45) Date of Patent: Jun. 2, 2026

(54) MACHINE LEARNED LANGUAGE MODEL BASED NATURAL LANGUAGE INTERFACE FOR QUERYING DATABASES

(71) Applicant: Maplebear Inc., San Francisco, CA (US)

(72) Inventors: Deepak Dilipkumar, New York, NY (US); Wahhaj Ali, Mississauga (CA); Karthik Ravishankar, Cincinnati, OH (US)

(73) Assignee: Maplebear Inc., San Francisco, CA (US)

( * ) Notice: Subject to any disclaimer, the term of this patent is extended or adjusted under 35 U.S.C. 154(b) by 15 days.

(21) Appl. No.: 18/830,414

(22) Filed: Sep. 10, 2024

(65) Prior Publication Data

US 2025/0086213 A1 Mar. 13, 2025

Related U.S. Application Data

(60) Provisional application No. 63/537,785, filed on Sep. 11, 2023.

(51) Int. Cl.
*G06F 16/00* (2019.01)
*G06F 16/31* (2019.01)
*G06F 16/334* (2025.01)

(52) U.S. Cl.
CPC .......... *G06F 16/3344* (2019.01); *G06F 16/31* (2019.01)

(58) Field of Classification Search
CPC ............................ G06F 16/3344; G06F 16/31
USPC ......................................................... 707/769
See application file for complete search history.

(56) References Cited

U.S. PATENT DOCUMENTS

| | | | | |
|---|---|---|---|---|
| 12,216,713 B1 * | 2/2025 | Shapira | ............. | G06F 16/90332 |
| 2024/0362209 A1 * | 10/2024 | Almaer | .............. | G06F 16/2433 |
| 2024/0362212 A1 * | 10/2024 | Sun | ................... | G06F 16/24522 |
| 2025/0077509 A1 * | 3/2025 | Schindel | ............... | G06F 16/212 |

* cited by examiner

*Primary Examiner* — Raquel Perez-Arroyo
(74) *Attorney, Agent, or Firm* — Fenwick & West LLP

(57) ABSTRACT

A system, such as an online system, allows users to ask natural language questions requesting information stored in a database. The system receives a natural language question. The system determines database tables and database queries associated with the natural language question. The system generates a prompt for input to a machine learned language model. The prompt specifies the natural language question, information describing database tables, and the example database queries. The system sends the prompt to the machine learned language model for execution and receives a response generated by the machine learned language model. The response includes a database query corresponding to the natural language question. The system sends the database query for execution on a database system and provides the result of execution of the database query to the client device.

20 Claims, 5 Drawing Sheets

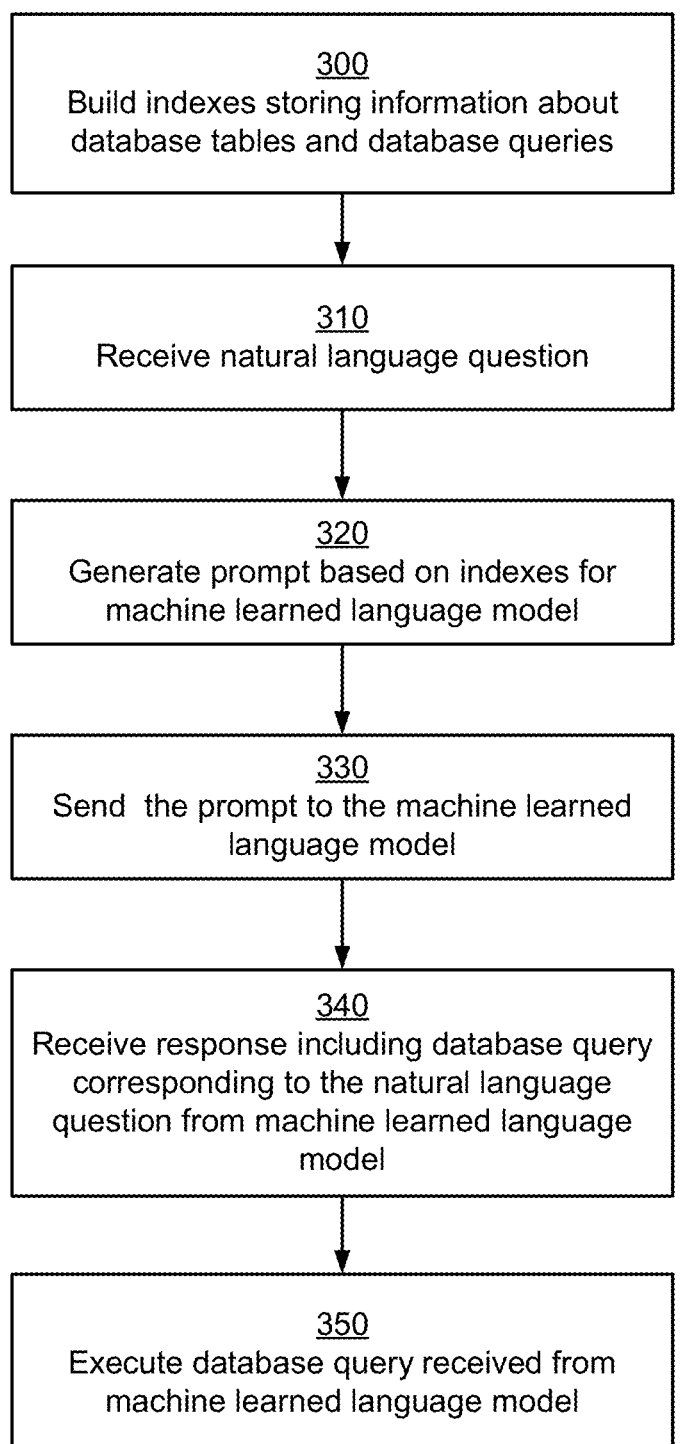

300
Build indexes storing information about database tables and database queries

310
Receive natural language question

320
Generate prompt based on indexes for machine learned language model

330
Send the prompt to the machine learned language model

340
Receive response including database query corresponding to the natural language question from machine learned language model

350
Execute database query received from machine learned language model

FIG. 3

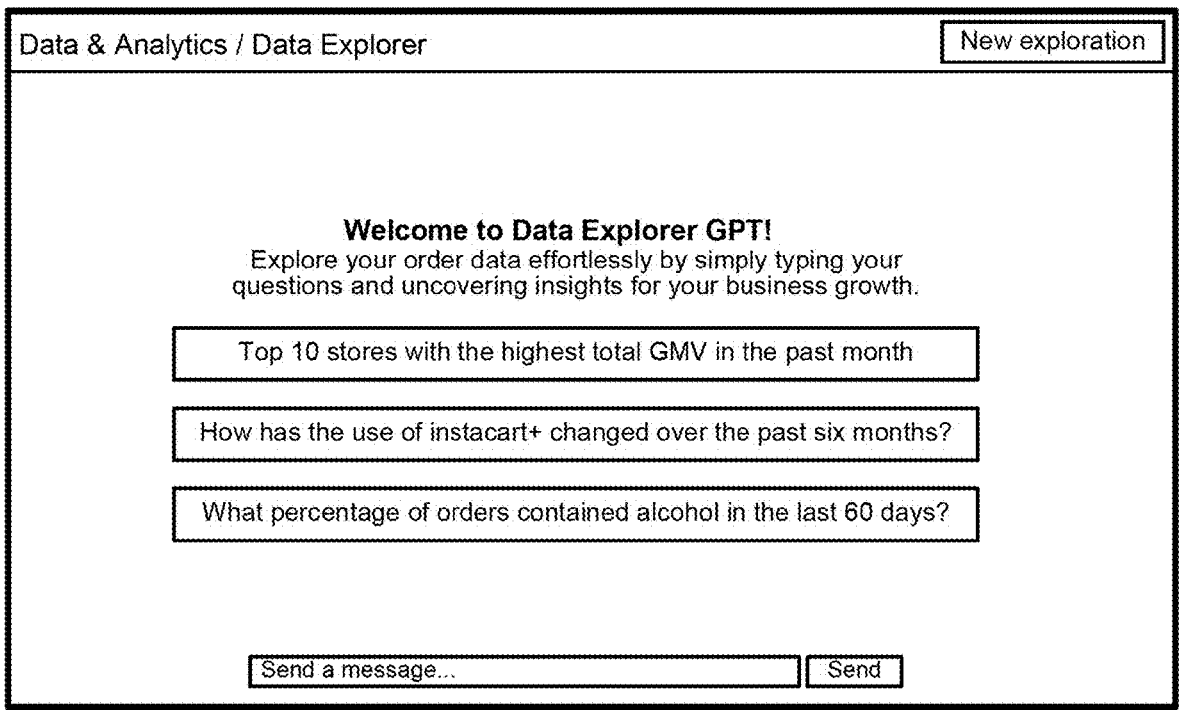

Welcome to Data Explorer GPT!
Explore your order data effortlessly by simply typing your
questions and uncovering insights for your business growth.

Top 10 stores with the highest total GMV in the past month

How has the use of instacart+ changed over the past six months?

What percentage of orders contained alcohol in the last 60 days?

FIG. 4A

Data & Analytics / Data Explorer                          New exploration

Here are the top 10 stores with the highest total GMV in the past month.

| Name | Sum Gmv |
| --- | --- |
| Store A1 | $999,999.00 |
| Store A2 | $888,888.00 |
| Store A3 | $777,777.00 |
| Store A4 | $666,666.00 |
| Store B1 | $99,999.00 |
| Store B2 | $88,88.00 |
| Store B3 | $77,777.00 |
| Store B4 | $66,666.00 |
| Store B4 | $55,555.00 |

Send a message...          Send

FIG. 4B

MACHINE LEARNED LANGUAGE MODEL BASED NATURAL LANGUAGE INTERFACE FOR QUERYING DATABASES

CROSS-REFERENCE TO RELATED APPLICATIONS

This application claims the benefit of U.S. Provisional Application No. 63/537,785, filed on Sep. 11, 2023, which is incorporated by reference herein in its entirety.

TECHNICAL FIELD

One or more aspects described herein relate generally to querying data stored in a database system and more specifically to providing a machine learned language model based natural language interface for querying databases.

BACKGROUND

An online system typically stores information in databases, for example, relational databases or document databases. Users query databases using database query languages such as structured query language (SQL). Querying a database for specific information requires knowledge of the schema of the database and also requires the user to be knowledgeable about database technology such as database query languages. An application may be provided that provides a user interface for inspecting the data of the database. However, such applications are typically programmed for specific use cases, for example, for a specific database schema and provide limited access to the data. As a result, a user of such an application is not able to access data that the application was not designed to access. Therefore, conventional approaches to access databases either require database expertise and knowledge on the part of the user or are restrictive in terms of the information that can be accessed.

SUMMARY

According to one or more embodiments, a system allows users to ask natural language questions requesting information stored in a database. The system receives a natural language question from a client device requesting information from a database. The system identifies a set of database tables and a set of example database queries relevant to the natural language question. The information describing the database tables and example database queries may be stored in a vector index. The system generates a prompt for a machine learned language model requesting the machine learned language model to generate a database query for answering the natural language question associated with the database. The prompt specifies the natural language question, and information describing database tables and example database queries relevant to the natural language question. The system sends the prompt to the machine learned language model for execution and receives a response generated by the machine learned language model. The response includes a database query corresponding to the natural language question. The system sends the database query for execution on a database system and provides the result of execution of the database query to the client device.

BRIEF DESCRIPTION OF THE DRAWINGS

FIG. 3 is a flowchart for answering queries based on comments from users, in accordance with one or more embodiments.

FIG. 4A shows a screenshot of a user interface for allowing users to specify natural language queries to extract information from a database, according to one or more embodiments.

FIG. 4B shows a screenshot of a user interface showing the result of executing a database query generated from the natural language queries, according to one or more embodiments.

DETAILED DESCRIPTION

An online system uses a machine learned language model, for example, a large language model (LLM) to provide a natural language interface for users to query data stored in a database. For example, tenants of the online system may store data describing product information and user information in a database. The online system allows users to query their data using natural language questions specified via a user interface. Although the techniques disclosed herein are described in terms of users of an online system, the techniques may be applied to any computing system for processing information stored in databases.

The online system stores information describing tables of the database as well as database queries based on the database tables in one or more vector indexes associated with the machine learned language model. The online system leverages the vector indexes to generate a prompt for the machine learned language model. The prompt requests the machine learned language model to generate a database query that extracts the data requested by the user in the natural language question. The prompt specifies the database tables relevant to a natural language question received from a user as well as sample queries based on the database tables. The online system provides the prompt to the machine learned language model and executes the machine learned language model to obtain a response that includes a database query corresponding to the natural language question. The online system executes the database query generated by the machine learned language model and returns the result of the database query to the user.

The disclosed techniques allow users without database expertise or knowledge of the underlying schema of a database, to query the database using natural language questions. Users such as retailers of an online system are not expected to have strong database expertise. The system allows such users to get insights into the data. For example, a user may ask a natural language question requesting information describing items that were purchased the most during a period, time periods when the purchases of an item were highest, profile of users that purchased the item more than a threshold number of times within a time period, and so on. Database query languages have strict syntax rules that must be conformed to while phrasing queries. As a result, such queries may be complicated to specify using database query languages. The system allows users to use a natural language interface to express such queries, thereby providing an improved user experience. Accordingly, the techniques disclosed herein provide a technological improvement over conventional techniques for accessing databases.

Figure 1A:
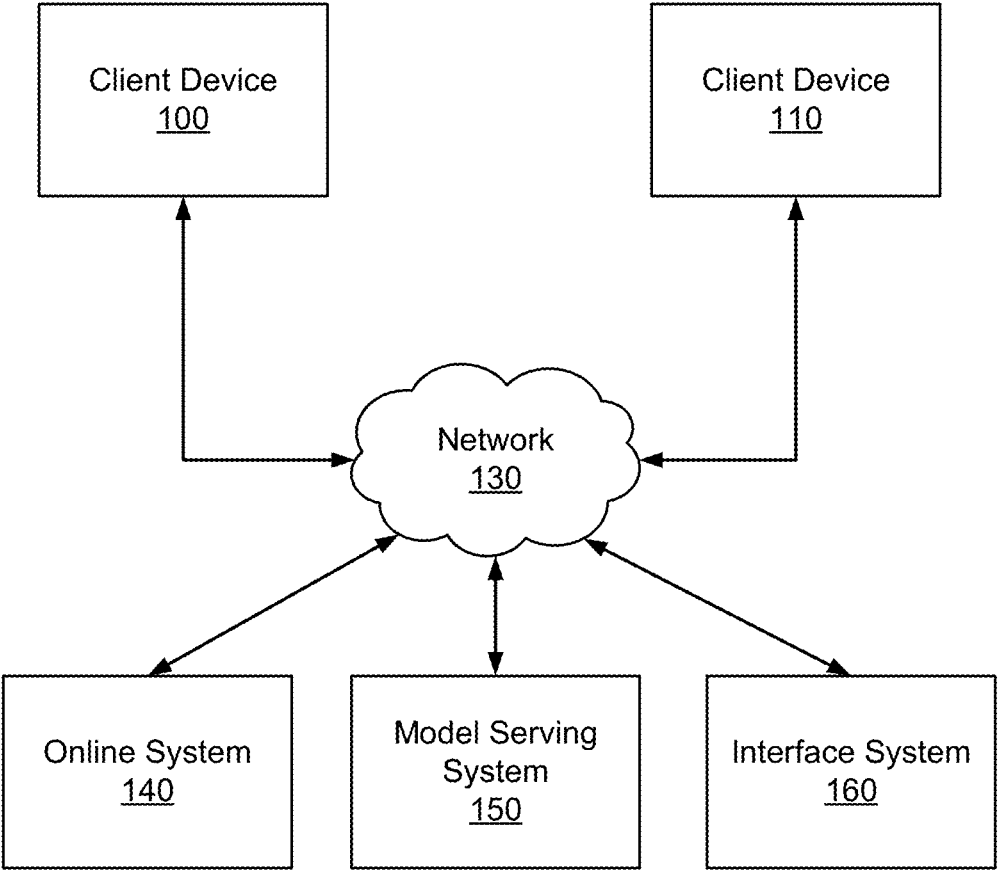
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes client devices 100, 110, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention. Additionally, any number of client devices may interact with the online system 140.

The client device 100 is a client device through which a user may interact with another client device 110, or the online system 140. The client device 100 can be a personal or mobile computing device, such as a smartphone, a tablet, a laptop computer, or desktop computer. In some embodiments, the client device 100 executes a client application that uses an application programming interface (API) to communicate with the online system 140.

The client device 110 is a client device through which a user may interact with other client devices 100, or the online system 140. The client device 110 can be a personal or mobile computing device, such as a smartphone, a tablet, a laptop computer, or desktop computer. In some embodiments, the client device 110 executes a client application that uses an application programming interface (API) to communicate with the online system 140.

The client devices 100, 110, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 receives natural language questions requesting information stored in a database. Accordingly, the online system 140 allows users to extract information from a database system using natural language questions that do not require knowledge of the underlying database schema or an expertise in dealing with database systems. The online system 140 interacts with the model serving system 150 and the interface system 160 to convert a natural language question to a database query specified using a database query language and executes the database query language to generate the result for providing to the user.

The model serving system 150 receives a request including input data (e.g., text data, audio data, image data, or video data) and encodes the input data into a set of input tokens. The model serving system 150 applies a machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. When the machine-learned model is a language model, the sequence of input tokens or output tokens are arranged as a tensor with one or more dimensions, for example, one dimension, two dimensions, or three dimensions.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLMs, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online system 140 that is fed to the machine learned language model of the model serving system 150, rather than relying on general knowledge encoded in the model weights of the model. Thus, one objective may be to perform various types of queries on the external data in order to perform any task that the machine learned language model of the model serving system 150 could perform. For example, the task may be to perform question-answering, text summarization, text generation, and the like based on information contained in an external dataset.

In one or more embodiments, the online system 140 is connected to the interface system 160. The interface system 160 receives data from the online system 140 (for example, information describing database tables and example database queries) and builds a vector index over the external data using, for example, another machine learned language model or heuristics.

The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of information obtained from the index as contextual information for the query.

The interface system 160 obtains one or more responses from the model serving system 150 and synthesizes a response to the query on the external data. While the online system 140 can generate a prompt for a machine learned language model using the external data as context, the amount of information in the external data may exceed prompt size limitations of the machine learned language model. The interface system 160 resolves prompt size limitations by generating a structured index of the data. The interface system 160 also offers data connectors to external data sources.

A database may store a large number of database tables and a large number of example database queries. A prompt including all the database tables and example database queries is likely to exceed the maximum prompt length of the machine learned language model. The interface system 160 allows the system to identify database tables and database queries relevant to a natural language question received from a user. The online system 140 generates a prompt for a machine learned language model based on the relevant database tables and database queries. The system sends the prompt to the machine learned language model.

Figure 1B:
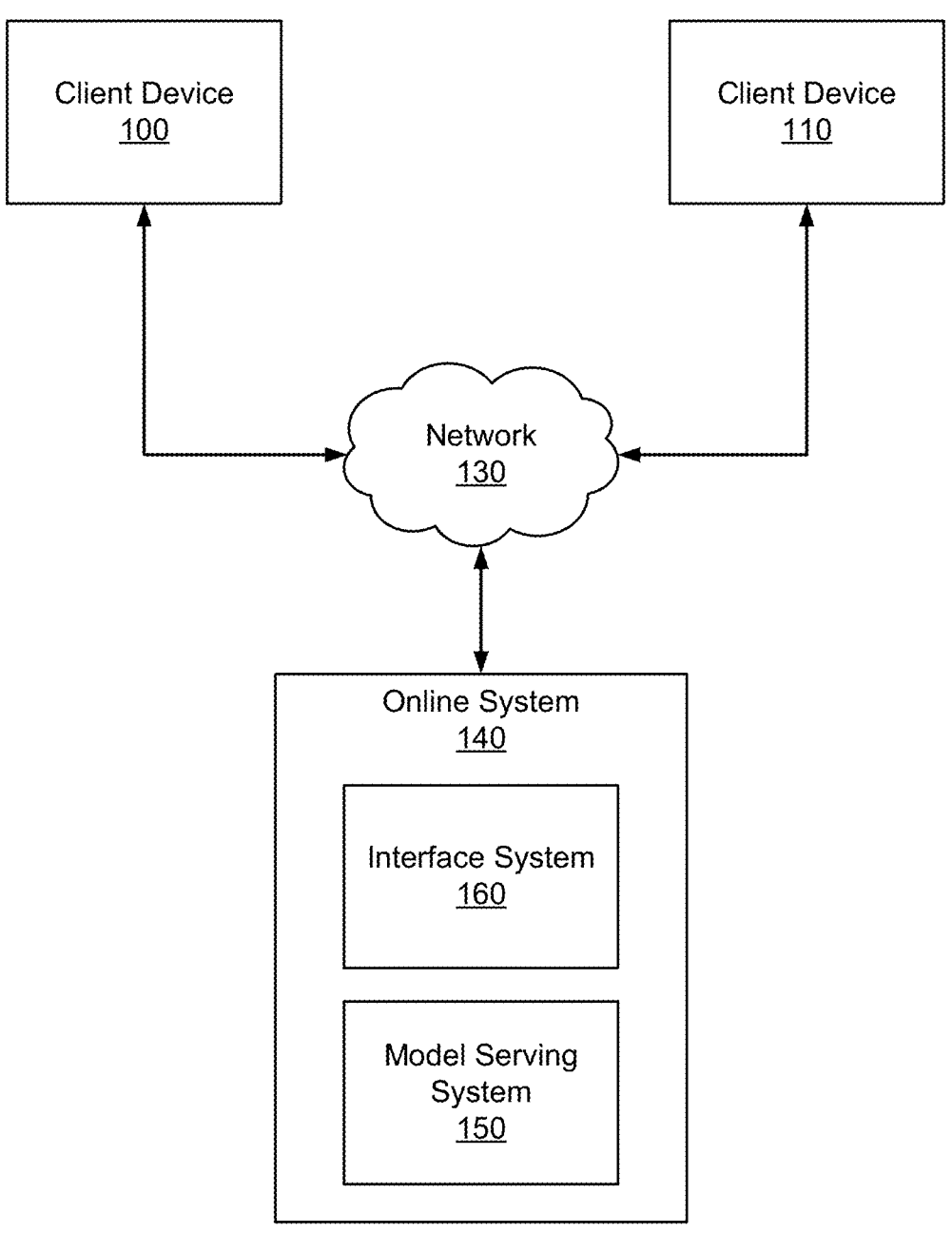
FIG. 1B illustrates another example system environment for an online system, in accordance with one or more embodiments.

FIG. 1B illustrates an example system environment for an online system 140, in accordance with one or more embodiments. The system environment illustrated in FIG. 1B includes client devices 100, 110, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140.

Figure 2:
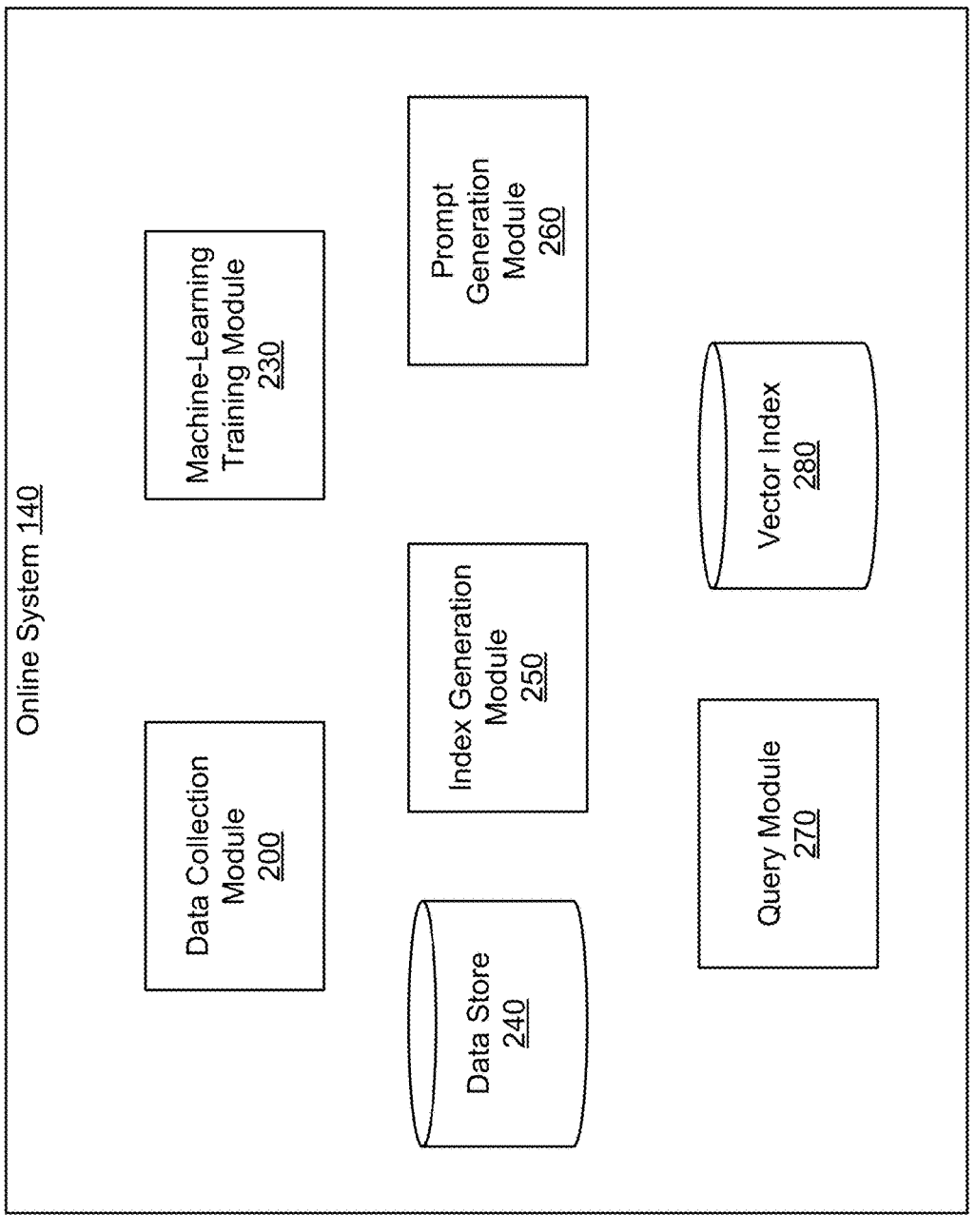
FIG. 2 illustrates an example system architecture for an online system, in accordance with one or more embodiments.

FIG. 2 illustrates an example system architecture for an online system 140, in accordance with one or more embodiments. The system architecture illustrated in FIG. 2 includes a data collection module 200, a content presentation module 210, an order management module 220, a machine learning training module 230, a data store 240, a prompt generation module 260, a query module 270, and an index generation module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found, the rate at which the item is found, or the popularity of the item. The data collection module 200 may collect item data from a retailer computing system 120, a client device 110.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered.

The online system allows users to ask natural language questions based on information such as order data, customer data, item data, and various combinations of different type of information.

The machine learning training module 230 trains machine learning models used by the online system 140. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, and order data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

The prompt generation module 260 generates a prompt based on a natural language question received from a user. The online system 140 prepares one or more prompts for input to the model serving system 150 based on the user's natural language question. The prompts request the model serving system 150 to generate a database query, for example, a SQL query corresponding to the natural language question. Details of the steps for generating a prompt are shown in the flowchart illustrated in FIG. 3 and described in connection with the figure.

The online system 140 receives a response to the prompt from the model serving system 150 based on execution of the machine learned language model using the prompt. The query module 270 extracts the database query from the response. The query module 270 executes the database query and provides the results to the user.

The index generation module 250 generates and stores information in vector indexes comprising information used for generating prompts. According to an embodiment, the index generation module 250 generates information describing database tables of the database using the machine learned language model. The index generation module 250 receives information describing database tables for a schema and database queries based on the database tables and provides them to the interface system 160 to generate indexes storing the information.

The index generation module 250 generates a prompt identifying (1) a set of database tables of the database and (2) sample data from each of the database tables of the set of database tables. The prompt requests the machine learned language model to generate a description of each database table in the set of database tables. The online system 140 provides the prompt to the machine learned language model and obtains a response by executing the machine learned language model. The index generation module 250 extracts description of the database tables of the set of database tables from the response obtained by executing the machine learned language model. The index generation module 250 stores the description of the database tables in the vector index 280 in relation with the corresponding database table.

The vector index 280 stores information describing the database tables and database queries for providing to a machine learned language model. Examples of a vector index include LlamaIndex™ and Langchain™. The vector index 280 stores vector representations of entities and allows searching for entities based on vector distances. For example, the online system 140 may store vector representations of description of database tables in the vector index 280. Similarly, online system 140 may store vector representations of example database queries in the vector index 280. The vector index 280 receives queries based on natural language questions or sentences and searches for database tables or examples database queries relevant to the natural language questions or sentences.

According to one or more embodiments, the system builds two indexes—a database table index for storing information describing database tables of a database schema and a database query index storing database queries based on the database tables of the database schema. According to one or more embodiments, the database table index is built by accessing the metadata describing the database tables of the database schema using either catalog tables of the database or using a system (e.g., Amundsen™ that stores a catalog of the database schema description. The database table index and database query index may be vector indexes associated with the machine learned language model, for example, vector indexes generated using LlamaIndex™ or Langchain™.

The system builds the database query index by accessing a store of historical data comprising past queries that were executed by users. The historical data may be extracted from a system such as Snowflake™ or from a source code repository or a version control system such as GitHub™. The system analyzes each database query to identify the table or tables used in the database query and stores the database query in the database query index in association with each database table used in the database query. The database query index may store database queries that process data in a single database query as well as complex database queries that join multiple database tables.

According to one or more embodiments, the online system 140 receives a natural language question requesting information stored in the databases of the online system. The online system 140 generates a vector index query for extracting relevant database tables based on the natural language question. The vector index query is configured to identify a set of database tables that are relevant to answering the natural language question. The vector index 280 executes the vector index query by generating a vector representation of the natural language question and identifying one or more database tables that have vector representations that are within a threshold vector distance of the vector representation of the natural language question. The vector index 280 may execute the vector index query by generating a vector representation of the natural language question, sorting database tables stored in the vector index 280 based on their vector distances from the vector representation of the natural language question, and selecting the top few database tables that have the closest vector distance from the vector representation of the natural language question. The prompt generation module 260 extracts a set of database tables relevant to the natural language question based on the vector index 280 and includes the database tables in the prompt generated for sending to the machine learned language model for generating a database query representing the natural language question.

According to an embodiment, the online system 140 extracts a set of example database queries based on the set of database tables determined to be relevant to the natural language question and specifies the set of example database queries in the prompt sent to the machine learned language model for generating a database query representing the natural language question. The online system 140 generates a vector index query for extracting a set of example database queries relevant to the natural language question. The vector index query is configured to identify a set of example database queries that are similar to a potential database query for answering the natural language question.

The vector index 280 executes the vector index query by generating a vector representation of the natural language question and identifying a set of example database queries that have vector representations that are within a threshold vector distance of the vector representation of the natural language question. The vector index 280 may execute the vector index query by generating a vector representation of the natural language question, sorting the example database queries stored in the vector index 280 based on their vector distances from the vector representation of the natural language question, and selecting the top few example database queries that have the closest vector distance from the vector representation of the natural language question. The prompt generation module 260 extracts a set of example database queries relevant to the natural language question based on the vector index 280 and includes the example database queries along with the set of database tables relevant to the natural language question in the prompt generated for sending to the machine learned language model for generating a database query representing the natural language question.

With respect to the machine learned language models hosted by the model serving system 150, the machine learned language models may already be trained by a separate entity from the entity responsible for the online system 140. In one or more embodiments, when the model serving system 150 is included in the online system 140, the machine learning training module 230 may further train parameters of the machine learned language model based on data specific to the online system 140 stored in the data store 240. As an example, the machine learning training module 230 may obtain a pre-trained transformer language model and further fine tune the parameters of the transformer model using training data stored in the data store 240. The machine learning training module 230 may provide the model to the model serving system 150 for deployment.

FIG. 3 is a flowchart illustrating the process for processing natural language questions requesting information from a database, in accordance with one or more embodiments. Alternative embodiments may include more, fewer, or different steps from those illustrated in FIG. 3, and the steps may be performed in a different order from that illustrated in FIG. 3. These steps may be performed by a system (e.g., online system 140).

The system builds 300 indexes storing information about database tables and database queries. The system receives 310 a natural language question requesting information stored in the database tables of the database schema. The natural language question may be asked using a user interface, for example, the user interface illustrated in FIG. 4A.

The system generates 320 a prompt for the machine learned language model, requesting the machine learned language model to generate a database query for processing the natural language question. According to one or more embodiments, the system includes information describing relevant database tables and database queries in the prompt. The system obtains the information describing relevant database tables from the database table index and the information describing relevant database queries from the database query index. The system includes in the prompt a format of the result returned by the machine learned language model. For example, the prompt may specify that the result should be specified as a JSON (Javascript Object notation) object or using XML format conforming to a specific XML schema. The prompt may include sample inputs and corresponding expected outputs. According to one or more embodiments, the system automatically adds to the prompt a section to restrict the generated database query to the specific retailer who is asking the question/is logged in.

The system sends 330 the prompt to the machine learned language model for execution. If the machine learned lanbers like row_id in the COMMENTS." An example of section S3 specifying examples is "Example prompt 1: . . . , Example result 1: . . . ; Example prompt 2: . . . , Example result 2: . . . ; Example prompt 3: . . . , Example result 3: . . . " Accordingly, the example section specifies example prompts and corresponding expected results.

The system receives 340 the response obtained as a result of execution of the machine learned language model based on the prompt. The response includes the database query generated by the machine learned language model based on the prompt for processing the natural language question. According to one or more embodiments, the database query is specified using SQL (structured query language) but may be specified using any other database query language supported by the database system being queried. Following is an example output generated by the machine learned language model representing an object encapsulating an SQL query.

```
{
"QUERY":
    "SELECT SUM(ORDER_AMT) AS SUM_AMT,
        CASE
            WHEN PICKUP_IND='Y' THEN 'Pickup'
            WHEN PICKUP_IND='N' THEN 'Delivery'
            ELSE 'Unknown'
        END AS PICKUP
    FROM ORDER_DATA
    WHERE ((PARTNER_ID = 100)
        AND (WAREHOUSE_ID = 120)
        AND (WAREHOUSE_LOCATION_ID IN (30, 40, 50))
        AND DELIVERED_DATE BETWEEN
            DATEADD(day, -7, CURRENT_DATE( )) AND CURRENT_DATE( ))
    )
    GROUP BY PICKUP
    ORDER BY SUM_AMT DESC ",
    "COMMENTS: "Here is the total AMT for 'Pickup' vs 'Delivery'.""
}
``` guage model is stored on the system, the system may execute the machine learned language model by providing the prompt as the input. The machine learned language model may be available as a service on a target system. In this embodiment, the system sends the prompt to the target system and invokes an API to execute the machine learned language model.

According to one or more embodiments, the prompt includes one or more sections. For example, a section S1 of the prompt describes the tables, a section S2 of the prompt includes the instructions, and a section S3 of the prompt provides a set of examples, and so on.

The section S1 may include description of a set of tables. The description of each table may include a table name, a description of the table, a description of each column of the table, one or more sample queries based on the table, and expected results based on the sample query. According to one or more embodiments, the system determines the set of database tables and the set of database queries by generating one or more prompts requesting the set of database tables and the set of database queries relevant to the natural language question and sending the prompt to the machine learned language model. The response (or responses) to the one or more prompts include(s) the set of database tables and the set of database queries relevant to the natural language question.

An example of instructions included in the prompt is "Return the answer as a JSON object with QUERY containing the SQL code and COMMENTS containing any relevant comments about the answer. Do not mention any ID num- The system may request the machine learned language model to provide a comment describing the query. The system uses the comment to perform a conversation with the user via the user interface.

According to one or more embodiments, the system analyzes the database query returned by the machine learned language model to determine whether the machine learned language model generated a valid query. For example, the system may parse the generated database query to make sure that there are no syntax errors in the generated query. The system may compile the database query and generate an execution plan to ensure that the database query does not refer to database tables that are non-existent. If the system determines that the database query is not a valid database query, the system sends a subsequent request to the machine learned language model to regenerate the database query.

The system may check if the database query returns any data that the user who provided the natural language question has access to. If the system determines that the database query provides data that the user does not have access to, the system sends a subsequent request to the machine learned language model, requesting the machine learned language model to regenerate the database query that limits the results returned to values that the user has access to. For example, if the system determines that the returned results include values that are meant for internal use, for example, retailer_id, transaction_id, and so on, the system requests the machine learned language model change the scope of the results so that these values are not returned.

The system executes the database query obtained from the response generated by the machine learned language model.

The system sends the generated database query to a database system, for example, Snowflake™ for execution. The system presents the results obtained by executing the database query to the user via a user interface, for example, the user interface illustrated in FIG. 4B.

According to one or more embodiments, given a natural language question, the system identifies the database tables and database queries relevant to the natural language question using the machine learned language model. For example, the system may generate a prompt requesting the machine learned language model to identify a set of database tables from the database table index that are relevant to the natural language question. The system may generate another prompt requesting the machine learned language model to identify a set of database queries from the database query index that are relevant to the natural language question. The system provides these prompts to the machine learned language model and executes the machine learned language model to obtain the respective set of database tables and set of database queries relevant to the natural language question. The system may generate a single prompt that provides both the set of database tables and the database queries. The set of database tables and the set of database queries are included with the prompt used for generating the database query corresponding to the natural language question.

FIG. 4A shows a screenshot of a user interface for allowing users to specify natural language queries to extract information from a database, according to one or more embodiments. The user interface may present a chat interface that allows a user to perform a natural language conversation with the system. The user interface presents a text input widget that allows the user to enter natural language questions. The user interface may display example natural language questions that a user can ask using the interface. For example, the example natural language questions may indicate that the user may ask the number of transactions executed within a time interval (e.g., past six months) that included a specific product (e.g., vitamins). The user may ask about changes in the usage of a system during a time interval, e.g., over the past year. The user may ask for a list of top N (e.g., N=10) stores (or physical locations that perform transactions) that have the highest number of transactions executed during a recent time interval. The user may ask for the list of top few stores that have the highest gross merchandise value in a recent time interval, for example past monthd.

FIG. 4B shows a screenshot of a user interface showing the result of executing a database query generated from the natural language queries, according to one or more embodiments. The results may be displayed in a tabular form with a column for each type of value being displayed. For example, in response to the natural language question requesting the list of top few stores that have the highest gross merchandise value in the past month, the user interface shows a table with two columns, a first column describing the store and a second column showing the gross merchandise value for the store.

Once the user receives the results of a natural language question, the user may ask a follow up natural language question, for example, another question that refines the previous natural language question. For example, for the above example, the user may ask a natural language question that requests the system to sort the results of the previous natural language question by a particular criterion, e.g., in decreasing order of gross merchandise value, or sorted alphabetically by the store name.

In one or more embodiments, the system performs validation of the database queries generated by the machine learned language model. For example, the system verifies whether the generated SQL is incorrect, or queries data that the user should not have access to. The system may provide the queries to an expert user for validation. Alternately, the system may parse the database query to ensure that the database query is correct syntactically. The database system may compile the database query against a database schema matching the database schema of the target database on which the database query is expected to be used. This allows the system to determine whether the tables accessed by the database query exist and if there are any compile time errors in the generated database queries. According to one or more embodiments, the system uses guardrail libraries to validate the database queries. The guardrail libraries allow various types of validation checks to be added.

As part of validation, the system may verify the data returned by the machine learned language model. For example, if the machine learned language model was provided a prompt that requested result in a specific format, e.g., JSON (JavaScript Object notation) object, the system verifies if the returned object is a valid JSON object that includes at least the database query attribute and an attribute for comments (if requested).

If the system determines as part of validation that the generated database query is not valid, the system sends a request to the machine learned language model to regenerate the database query. The system may modify the prompt to the machine learned language model to assist the machine learned language model in generating a valid database query. For example, the system may include the validation error and specify that the generated database query or the JSON object had a specific issue as identified and the machine learned language model should generate a result without the stated issue. If the system determines that the generated database query accesses database tables that the user should not have access to, the system modifies the prompt and sends it again to the machine learned language model for regenerating the database query. For example, the system may modify the prompt to mention database tables that the user does not have access to and request the machine learned language model to generate a database query that does not access the identified database tables. If the database query returns values that should not be presented to an end user (e.g., internal identifiers used by the database tables), the system may modify the prompt to state that the generated database query should not return results based on identified columns and the machine learned language model should regenerate the database query.

According to one or more embodiments, the machine learned language model is a pretrained machine learned language model that is further fine-tuned by retraining the model using training data obtained from the past executions based on the model. Pairs of prompt and generated output of database queries is collected, for example, based on past executions that may be stored in system logs. Accordingly, execution logs of the system are analyzed to extract prompts and corresponding database queries that were actually executed. Database queries obtained from prompts that returned errors are provided as negative training examples whereas database queries that were successfully executed are provided as positive training examples. Alternatively, the database queries that returned errors are excluded and database queries that executed successfully are included in the training dataset. The machine learned language model is retrained using the collected training data to improve the model.

According to an embodiment, the system receives a natural language request, generates a database query based on the natural language request, executes the database query to generate results and presents the results. The system receives from the user, subsequent natural language requests that refine the presented results of the previous natural language request. The next natural language request may refer to the result of the previous natural language request and request the system to further refine the result, for example, by filtering the rows/columns. For example, the next natural language request may refine the previous result to only present results satisfying a certain condition. Alternatively, the next natural language request may group the previous results based on one or more fields of the result. The system may provide along with a new prompt, the context of the previous natural language request and the database query previously generated along with the new natural language request. The new prompt is provided to the machine learned language model. The machine learned language model may generate a database query that composes the previous query with a new query, or modifies the previously generated database query, or generate a new database query that effectively composes the two natural language requests. Accordingly, a user can continue providing a series of natural language requests to incrementally refine results at each step and build a complex database query using the machine learned language model.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In one or more embodiments, a software module is implemented with a computer program product comprising one or more computer-readable media storing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
receiving, from a client device, a natural language question requesting information stored in a database, the database including a plurality of database tables;
identifying a set of database tables relevant for answering the natural language question, including:
converting the natural language question into a vector representation;
converting descriptions of the plurality of database tables into respective vector representations; and
comparing the vector representation of the natural language question and vector representations of the descriptions of the plurality of database tables to identify the set of database tables relevant for answering the natural language question;
identifying, from a database query index storing historical database queries in association with the plurality of database tables, a set of example database queries in association with the set of database tables;
generating a prompt for input to a machine learned language model, the prompt requesting the machine learned language model to generate a database query for accessing information needed for answering the natural language question, the prompt comprising:
    the natural language question,
    information describing the set of database tables, and the set of example database queries based on the set of database tables;
  sending the prompt to the machine learned language model for execution;
  receiving a response generated by the machine learned language model based on the prompt, the response comprising a database query;
    sending the database query for execution on a database system; and
    providing a result of execution of the database query to the client device.

2. The method of claim 1, further comprising:
  validating the database query received in the response generated by the machine learned language model; and
  responsive to generating an error based on the validation, modifying the prompt to include the error generated by the validation and providing the modified prompt for execution to the machine learned language model.

3. The method of claim 1, further comprising:
  storing in a vector index, information describing database tables of the database, wherein identifying the set of database tables relevant for answering the natural language question comprises executing a vector index query using the vector index, the vector index query specifying the natural language question.

4. The method of claim 3, wherein the vector index executes the vector index query by identifying database tables within a threshold vector distance of a vector representation of the natural language question.

5. The method of claim 3, further comprising:
  generating information describing database tables of the database using the machine learned language model.

6. The method of claim 5, wherein generating information describing database tables of the database using the machine learned language model comprises:
  generating a prompt identifying the set of database tables of the database, sample data from each of the database tables of the set of database tables, the prompt requesting the machine learned language model to generate a description of each database table in the set of database tables;
  providing the prompt to the machine learned language model;
  obtaining a response by executing the machine learned language model; and
  extracting a description of the database tables of the set of database tables from the response obtained by executing the machine learned language model.

7. The method of claim 6, wherein the prompt further comprises information describing relations between database tables of the set of database tables.

8. The method of claim 1, further comprising:
  storing in a vector index, example database queries, wherein identifying the set of example database queries comprises executing a vector index query using the vector index, the vector index query specifying the natural language question.

9. The method of claim 8, wherein the vector index query further specifies a set of tables relevant to the natural language question.

10. The method of claim 8, wherein the vector index executes the vector index query by identifying an example database query within a threshold vector distance of a vector representation of the natural language question.

11. A non-transitory computer readable storage medium storing instructions that when executed by one or more computer processors cause the one or more computer processors to perform steps comprising:
  receiving, from a client device, a natural language question requesting information stored in a database, the database including a plurality of database tables;
  identifying a set of database tables relevant for answering the natural language question, including:
    converting the natural language question into a vector representation;
    converting descriptions of the plurality of database tables into respective vector representations; and
    comparing the vector representation of the natural language question and vector representations of the descriptions of the plurality of database tables to identify the set of database tables relevant for answering the natural language question;
  identifying, from a database query index storing historical database queries in association with the plurality of database tables, a set of example database queries in association with the set of database tables;
  generating a prompt for input to a machine learned language model, the prompt requesting the machine learned language model to generate a database query for accessing information needed for answering the natural language question, the prompt comprising:
    the natural language question,
    information describing the set of database tables, and the set of example database queries based on the set of database tables;
  sending the prompt to the machine learned language model for execution;
  receiving a response generated by the machine learned language model based on the prompt, the response comprising a database query;
    sending the database query for execution on a database system; and
    providing a result of execution of the database query to the client device.

12. The non-transitory computer readable storage medium of claim 11, wherein the instructions cause the one or more computer processors to further perform steps comprising:
  validating the database query received in the response generated by the machine learned language model; and
  responsive to generating an error based on the validation, modifying the prompt to include the error generated by the validation and providing the modified prompt for execution to the machine learned language model.

13. The non-transitory computer readable storage medium of claim 11, wherein the instructions cause the one or more computer processors to further perform steps comprising:
  storing in a vector index, information describing database tables of the database, wherein identifying the set of database tables relevant for answering the natural language question comprises executing a vector index query using the vector index, the vector index query specifying the natural language question, wherein the vector index executes the vector index query by identifying database tables within a threshold vector distance of a vector representation of the natural language question.

14. The non-transitory computer readable storage medium of claim 12, wherein the instructions cause the one or more computer processors to further perform steps comprising:

generating information describing database tables of the database using the machine learned language model.

15. The non-transitory computer readable storage medium of claim 14, wherein generating information describing database tables of the database using the machine learned language model comprises:

generating a prompt identifying the set of database tables of the database, sample data from each of the database tables of the set of database tables, the prompt requesting the machine learned language model to generate a description of each database table in the set of database tables;

providing the prompt to the machine learned language model;

obtaining a response by executing the machine learned language model; and extracting a description of the database tables of the set of database tables from the response obtained by executing the machine learned language model.

16. The non-transitory computer readable storage medium of claim 15, wherein the prompt further comprises information describing relations between database tables of the set of database tables.

17. The non-transitory computer readable storage medium of claim 11, wherein the instructions cause the one or more computer processors to further perform steps comprising:

storing in a vector index, example database queries, wherein identifying the set of example database queries comprises executing a vector index query using the vector index, the vector index query specifying the natural language question.

18. The non-transitory computer readable storage medium of claim 17, wherein the vector index query further specifies a set of tables relevant to the natural language question.

19. The non-transitory computer readable storage medium of claim 17, wherein the vector index executes the vector index query by identifying an example database query within a threshold vector distance of a vector representation of the natural language question.

20. A computer system comprising:

one or more computer processors; and a non-transitory computer readable storage medium storing instructions that when executed by one or more computer processors cause the one or more computer processors to perform steps comprising:

receiving, from a client device, a natural language question requesting information stored in a database, the database including a plurality of database tables;

identifying a set of database tables relevant for answering the natural language question, including:

converting the natural language question into a vector representation;

converting descriptions of the plurality of database tables into respective vector representations; and comparing the vector representation of the natural language question and vector representations of the descriptions of the plurality of database tables to identify the set of database tables relevant for answering the natural language question;

identifying, from a database query index storing historical database queries in association with the plurality of database tables, a set of example database queries in association with the set of database tables;

generating a prompt for input to a machine learned language model, the prompt requesting the machine learned language model to generate a database query for accessing information needed for answering the natural language question, the prompt comprising:

the natural language question, information describing the set of database tables, and the set of example database queries based on the set of database tables;

sending the prompt to the machine learned language model for execution;

receiving a response generated by the machine learned language model based on the prompt, the response comprising a database query;

sending the database query for execution on a database system; and providing a result of execution of the database query to the client device.

* * * * *